(12) United States Patent
Hébert et al.

(10) Patent No.: US 10,202,881 B2
(45) Date of Patent: Feb. 12, 2019

(54) INTEGRATION OF EXHAUST GAS RECIRCULATION (EGR), EXHAUST HEAT RECOVERY (EHRS), AND LATENT HEAT STORAGE IN A COMPLETE EXHAUST THERMAL MANAGEMENT MODULE

(71) Applicant: Hanon Systems, Daejeon (KR)

(72) Inventors: Guillaume Hébert, Staré Město (CZ); L'uboslav Kollár, Poriadie (SK); Jiří Bazala, Korytná (CZ)

(73) Assignee: HANON SYSTEMS, Daejeon (KR)

( * ) Notice: Subject to any disclaimer, the term of this patent is extended or adjusted under 35 U.S.C. 154(b) by 90 days.

(21) Appl. No.: 15/408,482

(22) Filed: Jan. 18, 2017

(65) Prior Publication Data

US 2018/0087430 A1    Mar. 29, 2018

Related U.S. Application Data

(60) Provisional application No. 62/400,565, filed on Sep. 27, 2016.

(51) Int. Cl.
*F01N 3/00* (2006.01)
*F01N 5/02* (2006.01)
(Continued)

(52) U.S. Cl.
CPC .............. *F01N 5/02* (2013.01); *F01M 5/001* (2013.01); *F01N 3/021* (2013.01); *F01N 3/0205* (2013.01); *F01N 3/101* (2013.01); *F01P 11/08* (2013.01); *F01P 11/20* (2013.01); *F02D 41/0047* (2013.01); *F02M 25/00* (2013.01); *F02M 26/04* (2016.02); *F02M 26/06* (2016.02); *F02M 26/25* (2016.02); *F02M 26/28* (2016.02); *F01N 2240/02* (2013.01); *F01P 2011/205* (2013.01); *F01P 2060/04* (2013.01);
(Continued)

(58) Field of Classification Search
CPC .......... F01N 3/0205; F01N 3/021; F01N 5/02; F01P 11/08; F02M 26/04
USPC .......... 60/278, 280, 287, 297, 298, 311, 320
See application file for complete search history.

(56) References Cited

U.S. PATENT DOCUMENTS 5,101,801 A * 4/1992 Schatz .................... F02N 19/10
123/545
8,463,495 B2    6/2013 Spohn et al.
(Continued)

FOREIGN PATENT DOCUMENTS

JP    2009241780 A    10/2009
KR    20150067667 A    6/2015
KR    20160006195 A    1/2016

*Primary Examiner* — Phutthiwat Wongwian
*Assistant Examiner* — Diem Tran
(74) *Attorney, Agent, or Firm* — Shumaker, Loop & Kendrick, LLP; James D. Miller (57) ABSTRACT

A thermal energy management system for an internal combustion engine of a motor vehicle includes a coolant circuit including the internal combustion engine and a first heat exchanger. The coolant circuit is configured to convey a coolant therethrough. The thermal energy management system includes a gas circuit including the internal combustion engine, the first heat exchanger, and an exhaust line configured to convey an exhaust gas produced by the engine from the gas circuit. The first heat exchanger exchanging heat energy between the coolant flowing through the coolant circuit and the exhaust gas flowing through the gas circuit.

15 Claims, 4 Drawing Sheets

(51) Int. Cl.
    *F02M 26/04*     (2016.01)
    *F01N 3/02*     (2006.01)
    *F01N 3/021*     (2006.01)
    *F01N 3/10*     (2006.01)
    *F01P 11/08*     (2006.01)
    *F02M 25/00*     (2006.01)
    *F01P 11/20*     (2006.01)
    *F01M 5/00*     (2006.01)
    *F02D 41/00*     (2006.01)
    *F02M 26/06*     (2016.01)
    *F02M 26/25*     (2016.01)
    *F02M 26/28*     (2016.01)

(52) U.S. Cl.
    CPC .. *F01P 2060/16* (2013.01); *F02D 2041/0067* (2013.01); *F02D 2200/021* (2013.01); *F02D 2200/023* (2013.01)

(56) References Cited

U.S. PATENT DOCUMENTS

9,617,897 B2 *   4/2017   Hebert ........................ F01N 5/02
    9,784,201 B2 *  10/2017   Oyagi ..................... F02D 35/023
 2012/0143437 A1     6/2012   Spohn et al.

* cited by examiner

INTEGRATION OF EXHAUST GAS RECIRCULATION (EGR), EXHAUST HEAT RECOVERY (EHRS), AND LATENT HEAT STORAGE IN A COMPLETE EXHAUST THERMAL MANAGEMENT MODULE

CROSS-REFERENCE TO RELATED PATENT APPLICATIONS

This patent application claims the benefit of U.S. Provisional Patent Application No. 62/400,565, filed on Sep. 27, 2016. The entire disclosure of the above patent application is hereby incorporated herein by reference.

FIELD OF THE INVENTION

The present disclosure relates to a thermal energy management system of a motor vehicle having an internal combustion engine.

BACKGROUND

One issue present in an internal combustion engine is related to a low temperature of an engine block at the start of operation of the engine. The low temperature of the engine block at the start of operation of the engine undesirably leads to higher mechanical friction. The higher mechanical friction causes higher fuel consumption and higher carbon dioxide ($CO_2$) emissions. The issue especially occurs in a gasoline/electric hybrid vehicle, including "Stop/Start" conditions, where the internal combustion engine typically remains at a lower temperature in comparison to the internal combustion engine in a non-hybrid vehicle. The internal combustion engine of the hybrid vehicle remains at a lower temperature due to the occurrence of frequent shut-down periods such as when the hybrid vehicle is operating in an electric mode.

It is therefore desirable for the internal combustion engine to utilize recirculated fluids as heat sources to aid in regulating the temperature of the internal combustion engine. Typical examples of systems utilizing recirculated fluids are a Exhaust Gas Recirculation (EGR) system and a separate Exhaust Heat Recovery System (EHRS). Such systems may for example utilize an exchange of heat energy between the exhaust gases of the internal combustion engine and the coolant of the coolant system used to regulate the temperature of the engine block of the internal combustion engine.

The EHRS recovers the heat energy of exhaust gases following a starting of the engine, thereby minimizing the fuel consumption and the $CO_2$ emissions of the engine. One condition that may arise during the transfer of the heat energy between the coolant and the exhaust gases relates to an undesired supercooling of the coolant immediately following the starting of the engine. The thermal inertia of the EHRS in periods of time following the starting of the engine may result in low temperature exhaust gases exchanging heat energy with the coolant, thereby resulting in a situation where the coolant being relied upon to initially aid in heating the engine block is actually disadvantageously cooled within the EHRS. The cooling of the coolant causes the heating of the engine block to be negatively affected.

Another condition associated with the internal combustion engine utilizing the EGR system occurs during a stabilized run of the engine. During the stabilized run of the engine, the EGR system may in some instances transfer heat energy from the exhaust gases to the coolant wherein the heat transfer demand on the main coolant radiator is increased due to an excessive heating of the coolant beyond a desired temperature. The increased heat transfer results in the need for a larger heat exchanger with a higher aerodynamic drag, which in turn leads to higher fuel consumption and a loss of component packaging space within the vehicle. The energy dissipated by such a process is not of any use for recirculation and therefore, further lowers an efficiency of the system.

It would be desirable to provide an improved thermal energy management system that effectively regulates the temperate of the internal combustion engine by utilizing heat energy of exhaust gases exiting the internal combustion engine.

To provide the improved thermal energy system, it is desirable to add a Latent Heat Storage Unit (LHSU) to aid the thermal energy system in heating the coolant during the initial phases of warming of the internal combustion engine. The system including the LHSU further includes a two fluid EHRS utilizing a transfer of heat energy between the exhaust gases and the coolant of the engine. It may be further desirable to combine the EGR system and the EHRS into an integrated system having a single heat exchanger common to each system that is in heat exchange relationship with all three of the coolant, the exhaust gases, and the LHSU. Different combinations of exhaust gas routing may be achieved by use of two proportional valves and one On/Off or proportional valve on the EGR system. It is further desirable for the LHSU to reduce the amount of heat energy to be dissipated to the atmosphere by accumulating the heat energy, wherein the accumulated heat energy is reused after the engine start in order to minimize fuel consumption of the internal combustion engine while also minimizing the demand on the radiator to conduct heat energy transfer. The minimizing the demand on the radiator allows for minimizing a size of the radiator, which in turn minimizing an aerodynamic drag of the radiator to aid in minimizing the fuel consumption and $CO_2$ emissions of the vehicle.

There also exists a need for a separate oil cooler or water cooled oil cooler to aid in cooling oil used to lubricate the internal combustion engine while the engine is running in a stabilized phase. Accordingly, it is further desirable to utilize a three fluid EHRS that enables for a transfer of heat energy between the coolant, the exhaust gases, and the engine oil to efficiently manage a temperature of the engine block.

SUMMARY

Concordant and consistent with the present invention, a thermal energy management system that effectively regulates the temperature of an internal combustion engine by utilizing heat energy of exhaust gases exiting the internal combustion engine has surprisingly been discovered.

According to an embodiment of the invention, a thermal energy management system for an internal combustion engine of a motor vehicle includes a coolant circuit including the internal combustion engine and a first heat exchanger is disclosed. The coolant circuit is configured to convey a coolant therethrough. The thermal energy management system includes a gas circuit including the internal combustion engine, the first heat exchanger, and an exhaust line configured to convey an exhaust gas produced by the engine from the gas circuit. The first heat exchanger exchanging heat energy between the coolant flowing through the coolant circuit and the exhaust gas flowing through the gas circuit.

According to another embodiment of the invention, a thermal energy management system for an internal combustion engine of a motor vehicle is disclosed. The system includes a coolant circuit including the internal combustion engine and a first heat exchanger. The coolant circuit is configured to convey a coolant therethrough. A gas circuit includes the internal combustion engine, the first heat exchanger, and an exhaust line configured to convey an exhaust gas produced by the engine from the gas circuit. The first heat exchanger exchanges heat energy between the coolant flowing through the coolant circuit and the exhaust gas flowing through the gas circuit. An oil circuit includes a second heat exchanger in fluid communication with the first heat exchanger.

According to yet another embodiment of the invention, a method of operating a thermal energy management system for an internal combustion engine is disclosed. The method includes the steps of providing a coolant circuit including the internal combustion engine and a first heat exchanger. The coolant circuit is configured to convey a coolant therethrough. The method also includes the step of providing a gas circuit including the internal combustion engine, the first heat exchanger, and an exhaust line configured to convey an exhaust gas produced by the engine from the gas circuit. The first heat exchanger exchanges heat energy between the coolant flowing through the coolant circuit and the exhaust gas flowing through the gas circuit. An additional step includes operating the thermal management system in at least one of a first phase and a second phase. Furthermore, the method includes the step of selectively controlling at least a portion of an entirety of the flow of the exhaust gas to one of bypass the heat exchanger and mix with the air being introduced into the engine, flow to the exhaust line, and flow through the first heat exchanger.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and is not intended to limit the scope of the present disclosure.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the present disclosure, application, or uses.

Figure 1:
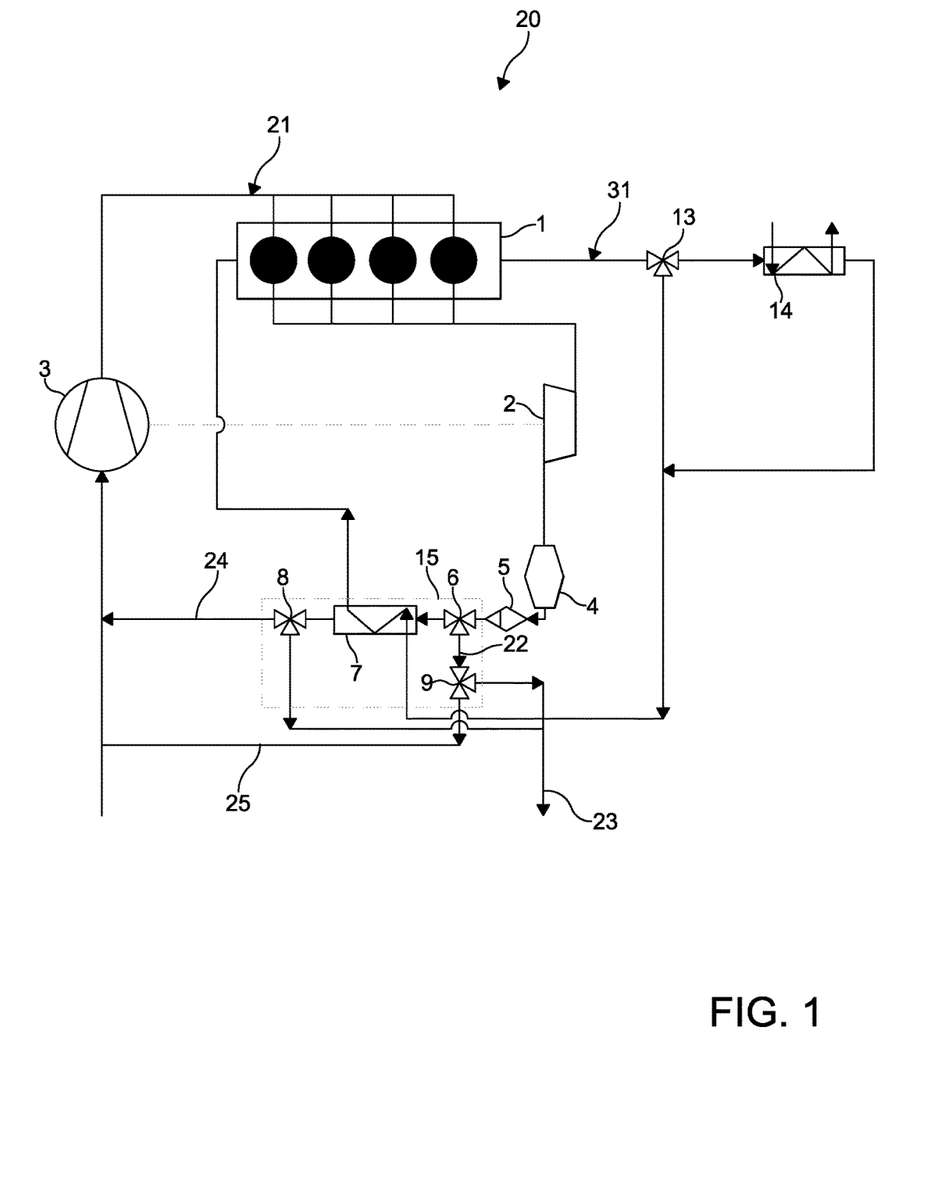
FIG. 1 is schematic flow diagram of a thermal energy management system for an internal combustion engine according to one embodiment of the invention.

FIG. 1 illustrates a thermal energy management system 20 of a vehicle having an internal combustion engine 1. The engine 1 may be installed in a hybrid vehicle also utilizing an electric energy source to power the vehicle. As such, circumstances exist wherein the engine 1 is subjected to periods of inactivity while the electric energy source of the vehicle is used primarily or solely to power the vehicle. However, the engine 1 may be used in association with any secondary form of power source or energy source or may be used in the absence of a secondary power source or energy source without departing from the scope of the present invention.

The engine 1 is in fluid communication and heat exchange communication with a gas circuit 21. The gas circuit 21 includes a compressor 3, the engine 1, a turbine 2 mechanically driving the compressor 3, a 3-way catalyst 4, a debris filter 5, a first proportional valve 6, a heat exchanger 7 such as a gas to coolant heat exchanger, for example, and a second proportional valve 8. An upstream end of the compressor 3 is disposed downstream of the second proportional valve 8 and a downstream end of the compressor 3 is disposed upstream from the engine 1. The gas circuit 21 further includes an exhaust branch 22 extending from a branch of the first proportional valve 6 to an exhaust line 23 exposed to an environment such as the atmosphere, for example. The exhaust branch 22 includes an On/Off valve 9 disposed downstream of the first proportional valve 6 and upstream of the exhaust line 23. The exhaust line 23 is in fluid communication with each of the On/Off valve 9 and the second proportional valve 8. A first recirculation line 24 extends from the second proportional valve 8 to the upstream end of the compressor 3. A second recirculation line 25 extends from the On/Off valve 9 to the upstream end of the compressor 3.

The engine 1 is also in fluid communication and heat exchange communication with a coolant circuit 31 having a coolant circulating therethrough. The coolant circuit 31 includes the engine 1, a first thermostatic valve 13, a radiator 14, and the heat exchanger 7. The first thermostatic valve 13 controls a flow of the coolant passing through the radiator 14 based on a temperature of the coolant after passing through the engine 1. The radiator 14 releases heat energy of the coolant when the coolant is passed through the radiator 14.

Operation of the thermal energy management system 20 including the gas circuit 21 and the coolant circuit 31 may be described with reference to three phases of operation corresponding to different temperature conditions of the engine 1. The utilization of the three phases of operation aid in reducing the fuel consumption and the CO2 emissions of the engine 1 during a heating of the engine 1.

The first phase takes place immediately after engine start, wherein the coolant is in a cold condition, the exhaust gases are in a cold condition, and the engine 1 and associated engine block are also in a cold condition. First, following activation of the engine 1, air is directed to the compressor 3 and compressed before entering the engine 1. The air is mixed with fuel and combusted in the engine 1 to produce the exhaust gases. The exhaust gases flow through the turbine 2 to drive the compressor 3. The exhaust gases then flow through the 3-way catalyst 4 and the debris filter 5. The debris filter 5 protects the compressor 3 from damage by removing debris carried by the exhaust gases.

When operating in the first phase, the first proportional valve 6 is adjusted to direct at least a portion of the exhaust gases towards the On/Off valve 9. The On/Off valve 9 is positioned to direct an entirety of the flow passing therethrough through the second recirculation line 25. In some circumstances, an entirety of the flow of the exhaust gases is caused to flow through the first proportional valve 6 and then the second recirculation line 25. The exhaust gases passing through the second recirculation line 25 bypass the heat exchanger 7 and do not exchange heat energy with the coolant flowing through the heat exchanger 7. As a result, the exhaust gases passing through the second recirculation line 25 are mixed with the air being introduced into the engine 1 to result in a gas mixture with an elevated temperature. This heated gas mixture is then able to assist in rapidly heating the engine 1 during the first phase to reduce the incidence of mechanical friction therein.

During operations wherein a portion of the exhaust gases pass through the first proportional valve 6 and through the heat exchanger 7, heat energy is exchanged with the coolant passing through the heat exchanger 7. The coolant is heated before passing through the engine 1 to aid the coolant in heating the engine 1. The first thermostatic valve 13 is adjusted to cause the coolant to bypass the radiator 14 to allow the coolant to continue to be heated within the heat exchanger 7 in order to heat the engine 1. Accordingly, the engine 1 is heated by duel action of the coolant and the recirculated exhaust gases. The second proportional valve 8 is adjusted to cause an entirety of the flow of the exhaust gases passing through the heat exchanger 7 to flow to the exhaust line 23 to exhaust the gases from the thermal energy management system 20.

Operation of the thermal energy management system 20 in the second phase occurs when the engine 1 reaches a temperature wherein heating of the coolant in the heat exchanger 7 is suitable for heating the engine 1 in the absence of the non-cooled exhaust gases passing through the second recirculation line 25. The second phase generally occurs after a period of time after the engine start, wherein the engine 1 has been operating for the period of time. Accordingly, the first proportional valve 6 is adjusted wherein the entirety of the flow of the exhaust gases flows towards the heat exchanger 7 instead of towards the On/Off valve 9. The heated exhaust gases therefore heat the coolant flowing through the heat exchanger 7 before the coolant is used to continue to heat the engine 1. The second proportional valve 8 may be adjusted to a position wherein the exhaust gases passing through the heat exchanger 7 are directed towards both the exhaust line 23 and the first recirculation line 24 at desired proportions to form a desired degree of exhaust gas mixing with the air entering the compressor 3. During operation in the second phase, the first thermostatic valve 13 may continue to cause the coolant to not flow over the radiator 14 to allow the coolant to continue to be heated within the heat exchanger 7.

Operation of the thermal energy management system 20 in the third phase occurs when the engine 1 has reached a stabilized function and requires cooling instead of heating. The first thermostatic valve 13 is adjusted to cause the coolant to flow through the radiator 14 to cool the coolant. The cooled coolant is then flowed through the heat exchanger 7. The first proportional valve 6 is adjusted to cause the entirety of the exhaust gases to flow through the heat exchanger 7. The coolant cools the exhaust gases in the heat exchanger 7 and the exhaust gases are delivered to the first recirculation line 24 and the exhaust line 23 by the second proportional valve 8 in association with the desired degree of exhaust gas and air mixing.

As shown in FIG. 1, the first proportional valve 6, the second proportional valve 8, the heat exchanger 7, and the On/Off valve 9 may be packaged together as a single module 15. The module 15 may be suitable for adaptation to a plurality of different vehicles having similar components such as those disclosed hereinabove as forming the thermal energy management system 20.

Figure 2:
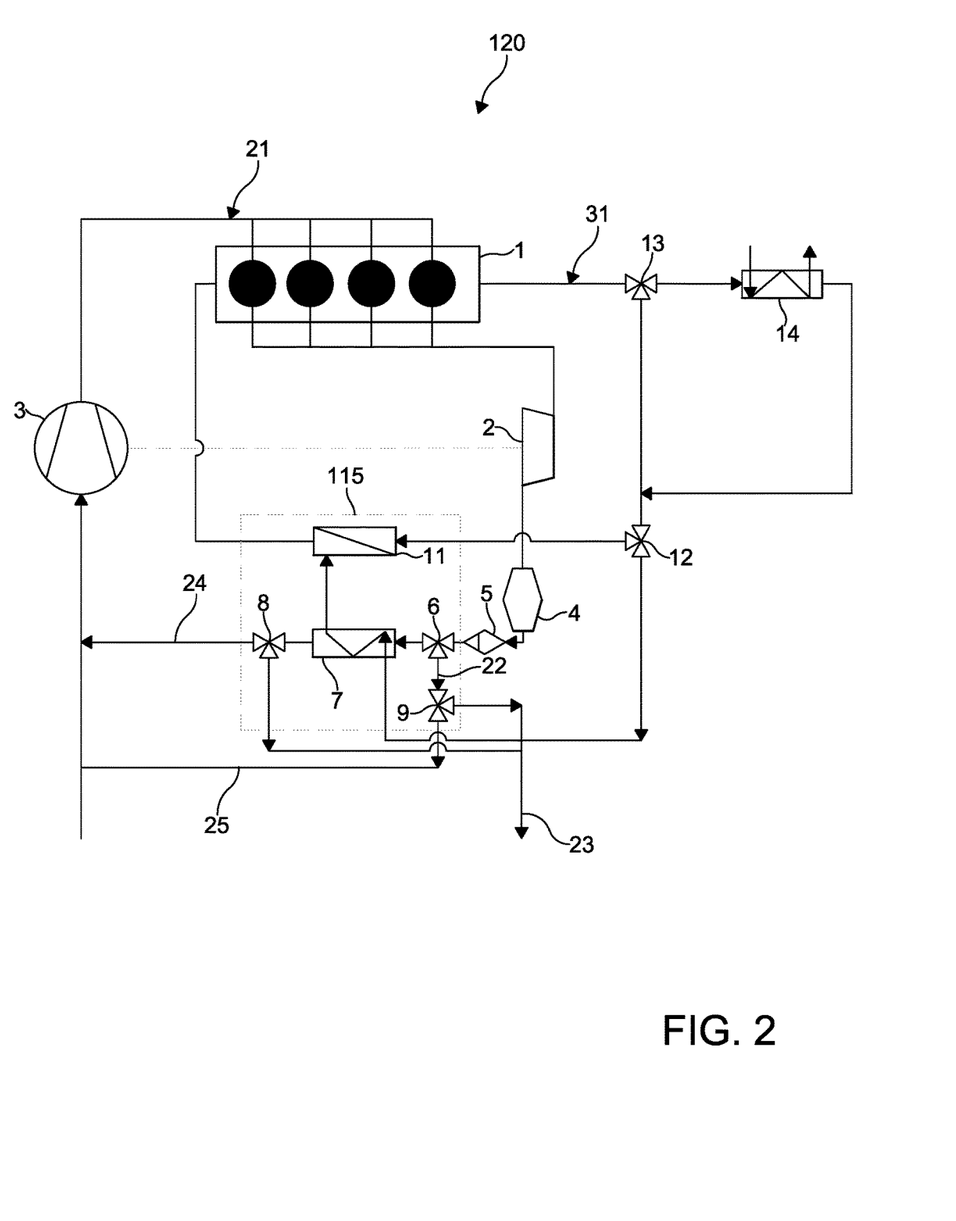
FIG. 2. is schematic flow diagram of a thermal energy management system having a latent heat storage unit for use with an internal combustion engine according to another embodiment of the invention.

FIG. 2 illustrates a thermal energy management system 120 according to another embodiment of the invention. The thermal energy management system 120 is substantially similar to the thermal energy management system 20 of FIG. 1 with the exception of the addition of a latent heat storage unit (LHSU) 11 and associated integrating structure. Features similar to the features of the thermal energy management system 20 of FIG. 1 are referenced with the same reference numeral for convenience.

The LHSU 11 is disposed downstream of a second thermostatic valve 12 disposed on the gas circuit 21. The second thermostatic valve 12 is disposed downstream of each of the first thermostatic valve 13 and the radiator 14. The second thermostatic valve 12 is configured to control a flow of the coolant towards one of the heat exchanger 7 and the LHSU 11. The second thermostatic valve 12 may also be configured to control the distribution of the coolant based on a temperature of the coolant when encountering the second thermostatic valve 12. The coolant flowing through the heat exchanger 7 is also in fluid communication with the LHSU 11 downstream of the heat exchanger 7 and upstream of the engine 1.

The thermal energy management system 120 may be operable in three different phases of operation based on a temperature of the engine 1 in similar fashion to the thermal energy management system 20.

Operation of the thermal energy management system 120 in the first phase includes the coolant, the exhaust gases, and the engine 1 being in a cold condition. The first proportional valve 6 and the On/Off valve 9 are adjusted to direct at least a portion of the exhaust gases to the compressor 3 and bypass the heat exchanger 7 to increase a rate of heating of the engine 1. Any exhaust gases flowing through the heat exchanger 7 aid in heating the coolant and are exhausted through the exhaust line 23 via the second proportional valve 8. Latent heat energy stored in the LHSU 11 is transferred to the coolant to further heat the coolant. The heated coolant then aids in rapidly heating the engine 1 to reduce the incidence of mechanical friction therein. In some circumstances, the first phase can include the second thermostatic valve 12 directing all of the coolant through the LHSU 11 to maximize the heat recovery from the LHSU 11 to maximize an efficiency of the thermal energy management system 120.

Operation of the thermal energy management system 120 in the second phase includes the engine 1 having reached a temperature wherein heating of the coolant in the heat exchanger 7 is suitable for heating the engine 1 in the absence of the stored heat energy present in the LHSU 11. The first proportional valve 6 is adjusted wherein the entirety of the flow of the exhaust gas flows towards the heat exchanger 7 instead of directing a proportion or all of the exhaust gases towards the On/Off valve 9 and the second recirculation line 25. The second thermostatic valve 12 is adjusted to cause the entirety of the exhaust gases to flow towards the heat exchanger 7. The heated exhaust gases therefore heat the coolant within the heat exchanger 7 before the coolant is used to heat the engine 1. The second proportional valve 8 may be adjusted to a position wherein the exhaust gases passing through the heat exchanger 7 are directed towards both the exhaust line 23 and the first recirculation line 24 at desired proportions to form a desired degree of exhaust gas mixing with the air entering the compressor 3. During operation in the second phase, the first thermostatic valve 13 may continue to cause the coolant to bypass or not flow over the radiator 14 to prevent undesirable cooling of the coolant.

Operation of the thermal energy management system 120 in the third phase occurs when the engine 1 has reached a stabilized function and requires cooling instead of heating. The first thermostatic valve 13 is adjusted to cause the coolant to flow through the radiator 14 to cool the coolant. The second thermostatic valve 12 is adjusted to cause the coolant flowing through the second thermostatic valve 12 to be directed entirely towards the heat exchanger 7 and not towards the LHSU 11. The first proportional valve 6 is adjusted to cause the entirety of the exhaust gases to flow through the heat exchanger 7. The cooled coolant is then flowed through the heat exchanger 7 where the coolant receives heat energy from the heated exhaust gases. The coolant and the exhaust gases exchange heat energy in the heat exchanger 7 and the exhaust gases are delivered to the first recirculation line 24 and the exhaust line 23 by the second proportional valve 8 in association with the desired degree of exhaust gas and air mixing. The heated coolant then flows through the LHSU 11 to store heat energy within the LHSU 11 in anticipation of operation of the thermal energy management system 120 in the first phase. The release of heat energy from the coolant to the LHSU 11 advantageously allows for a heat transfer demand of the radiator 14 to be reduced, thereby reducing a size needed for the radiator 14.

As shown in FIG. 2, the first proportional valve 6, the second proportional valve 8, the heat exchanger 7, the On/Off valve 9, and the LHSU 11 may be packaged together as a single module 115. The module 115 may be suitable for adaptation to a plurality of different vehicles having similar components such as those disclosed hereinabove as forming the thermal energy management system 120.

Figure 3:
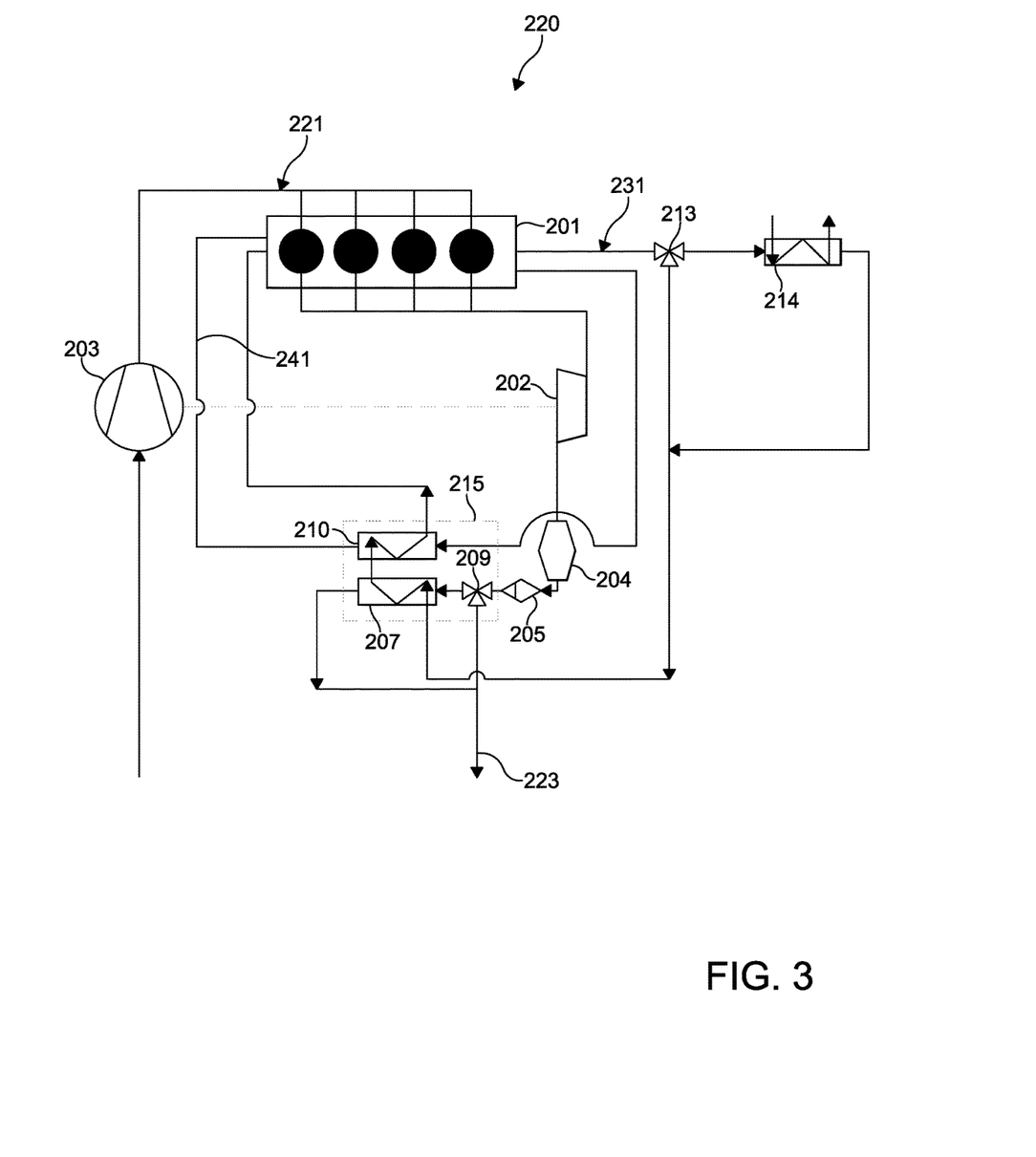
FIG. 3 is schematic flow diagram of a thermal energy management system having an oil heat exchanger for use with an internal combustion engine according to another embodiment of the invention.

FIG. 3 illustrates a thermal energy management system 220 according to another embodiment of the invention. Features similar to the thermal energy management system 20, 120 of FIGS. 1-2 are referenced with the same reference numeral with a preceding "2." The thermal energy management system 220 includes the gas circuit 221 having the compressor 203, the internal combustion engine 201, the turbine 202, the 3-way catalyst 204, the debris filter 205, the On/Off valve 209, and the heat exchanger 207. The On/Off valve 209 is adjustable to cause an entirety of a flow of exhaust gases from the engine 201 to flow towards one of the heat exchanger 207 and the exhaust line 223. A downstream end of the heat exchanger 207 is also in fluid communication with the exhaust line 223.

The engine 201 is also in fluid communication and heat exchange communication with the coolant circuit 231 having a coolant circulating therethrough. The coolant circuit 231 includes the engine 201, the first thermostatic valve 213, the radiator 214, the heat exchanger 207, and an oil heat exchanger 210. The oil heat exchanger 210 is configured to exchange heat energy between an oil circulating through the engine 201 and the coolant flowing through the coolant circuit 231. The oil flows from from the engine 201 to the oil heat exchanger 210 and from the oil heat exchanger 210 back to the engine 201 through an oil loop 241.

The thermal energy management system 220 may be operable in two different phases of operation based on a temperature of the engine 201.

Operation of the thermal energy management system 220 in the first phase includes the coolant, the exhaust gases, and the engine 201 being in a cold condition. At least a portion of the exhaust gases exiting the engine 201 are directed by the On/Off valve 209 towards the heat exchanger 207 where the heated exhaust gases release heat energy to the coolant passing through the heat exchanger 207. The exhaust gases not directed towards the heat exchanger 207 are directed towards the exhaust line 223. In certain scenarios and entirety of the exhaust gases flowing through the On/Off valve 209 will flow to the heat exchanger 207. The heated coolant then flows from the heat exchanger 207 towards the oil heat exchanger 210 wherein the heated coolant further heats the oil to be circulated though the engine 201. Accordingly, both the coolant and the oil are heated by the exhaust gases to cause the engine 201 to be heated to reduce the incidence of mechanical friction within the engine 201. The first thermostatic valve 213 is adjusted to prevent the coolant from flowing to the radiator 214, thus bypassing the radiator 214.

Operation of the thermal energy management system 220 in the second phase occurs when the engine 201 has reached a stabilized function and requires cooling instead of heating. Accordingly, the coolant may be used to cool the engine 201 directly as well as to cool the oil circulated within the engine 201, thereby presenting dual cooling of the engine 201. In the second phase, the first thermostatic valve 213 is positioned to allow the coolant to flow through the radiator 214, wherein heat energy from the coolant is released. The On/Off valve 9 is adjusted to cause the entirety of the exhaust gases to flow through the heat exchanger 207. The cooled coolant from the radiator 214 is then flowed through the heat exchanger 207 where the coolant receives heat energy from the heated exhaust gases. The coolant and the exhaust gases exchange heat energy in the heat exchanger 207 and the exhaust gases are delivered to the exhaust line 223. The cooled coolant is also circulated through the oil heat exchanger 210 where heat energy is exchanged between the oil flowing through the oil loop 241 and the coolant flowing through the coolant circuit 231.

As shown in FIG. 3, the On/Off valve 209, the heat exchanger 207, and the oil heat exchanger 210 may be packaged together as a single module 215. The module 215 may be suitable for adaptation to a plurality of different vehicles having similar components such as those disclosed as forming the thermal energy management system 220.

Figure 4:
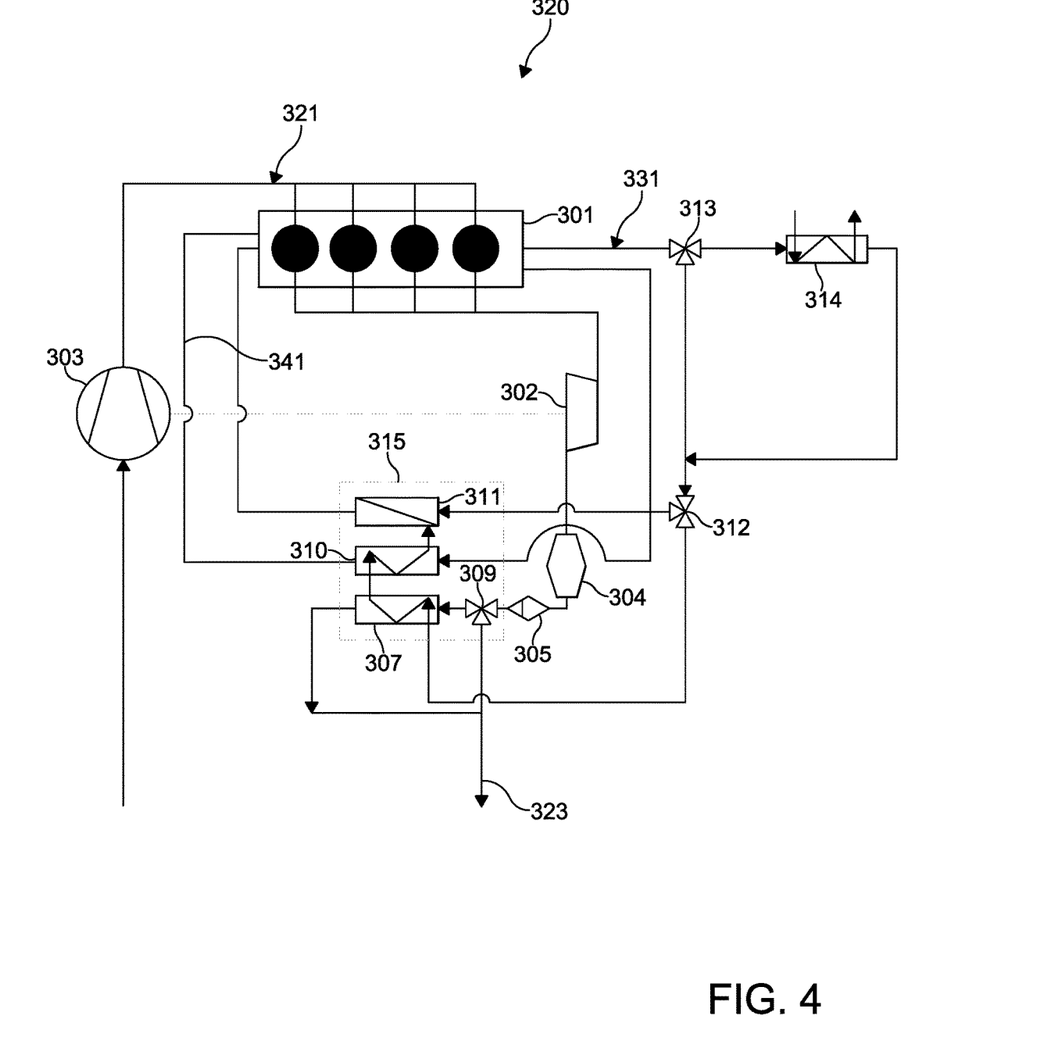
FIG. 4 is schematic flow diagram of a thermal energy management system having both a latent heat storage unit and an oil evaporator for use with an internal combustion engine according to another embodiment of the invention.

FIG. 4 illustrates a thermal energy management system 320 according to another embodiment of the invention. Features similar to the thermal energy management system 20, 120, 220 of FIGS. 1-3 are referenced with the same reference numeral with a preceding "3." The thermal energy management system 320 includes the gas circuit 321 having the compressor 303, the engine 301, the turbine 302, the 3-way catalyst 304, the debris filter 305, the On/Off valve 309, and the heat exchanger 307. The On/Off valve 309 is adjustable to cause an entirety of a flow of the exhaust gases to flow towards one of the heat exchanger 307 and the exhaust line 323. A downstream end of the heat exchanger 307 is also in fluid communication with the exhaust line 323.

The engine 301 is also in fluid communication and heat exchange communication with the coolant circuit 331 having a coolant circulating therethrough. The coolant circuit 331 includes the engine 301, the first thermostatic valve 313, the radiator 314, the second thermostatic valve 312, the heat exchanger 307, the oil heat exchanger 310, and the LHSU 311. The oil heat exchanger 310 is configured to exchange heat energy between an oil circulating through the engine 301 and the coolant flowing through the coolant circuit 331. The LHSU 311 is disposed downstream of the second thermostatic valve 312 disposed in the coolant circuit 331. The second thermostatic valve 312 is disposed downstream of each of the first thermostatic valve 313 and the radiator 314. The second thermostatic valve 312 is configured to control a flow of the coolant towards one of the heat exchanger 307 and the LHSU 311. The second thermostatic valve 312 may be configured to control the distribution of the coolant based on a temperature of the coolant when encountering the second thermostatic valve 312. The coolant flowing through the heat exchanger 307 is also in fluid communication with each of the oil heat exchanger 310 and the LHSU 311 downstream of the heat exchanger 307 and upstream of the engine 301 with respect to a flow of the coolant.

The thermal energy management system 320 may be operable in three different phases of operation based on a temperature of the engine 301 in similar fashion to the thermal energy management systems 20 and 120.

Operation of the thermal energy management system 320 in the first phase includes the coolant, the exhaust gases, and the engine 301 being in a cold condition. The coolant exiting the engine 301 bypasses the radiator 314 via the first thermostatic valve 313 and is directed by the second thermostatic valve 312 towards the LHSU 311 and not towards the heat exchanger 307. The LHSU 311 releases latent heat to the coolant passing therethrough to heat the coolant. The coolant heated by the LHSU 311 is then able to be circulated through the engine 301 to heat the engine 301. In certain embodiments, at least a portion of the exhaust gases exiting the engine 301 are directed by the On/Off valve 309 towards the heat exchanger 307 where the heated exhaust gases release heat energy to the coolant passing through the heat exchanger 307. The exhaust gases not directed towards the heat exchanger 307 are directed towards the exhaust line 323. In certain scenarios an entirety of the exhaust gases flowing through the On/Off valve 309 will flow to the heat exchanger 307. The heated coolant then flows from the heat exchanger 307 towards the oil heat exchanger 310 wherein the heated coolant further heats the oil to be circulated though the engine 301. The heated coolant can then flow to the LHSU 311 to store heat in the LHSU 311 to further heat the coolant passing through the LHSU 311.

Operation of the thermal energy management system 320 in the second phase includes the LHSU 311 having already transferred the heat energy stored thereto to the coolant. The second thermostatic valve 312 is adjusted in position to cause the coolant to flow towards the heat exchanger 307 and not directly towards the LHSU 311. The heated exhaust gases exiting the engine 301 are used to heat the coolant flowing through the heat exchanger 307. The heated coolant is then able to transfer heat energy to both the oil flowing through the oil heat exchanger 310 and the engine 301 itself, promoting dual action heating of the engine 301.

Operation of the thermal energy management system 320 in the third phase occurs when the engine 301 has reached a stabilized function and requires cooling instead of heating. The coolant is caused to flow through the radiator 314 to cool the coolant after exiting the engine 301. The cooled coolant then flows through each of the heat exchanger 307, the oil heat exchanger 310, and the LHSU 311. The coolant receives heat energy from each of the exhaust gases passing through the heat exchanger 307 and the oil passing through the oil heat exchanger 310. The heated coolant then flows through the LHSU 311 to store heat energy within the LHSU 311 in anticipation of operation of the thermal energy management system 320 in the first phase. The release of heat energy from the coolant to the LHSU 311 advantageously allows for a heat transfer demand of the radiator 314 to be reduced.

As shown in FIG. 4, the On/Off valve 309, the heat exchanger 307, the oil heat exchanger 310, and the LHSU 311 may be packaged together as a single module 315. The module 315 may be suitable for adaptation to a plurality of different vehicles having similar components such as those disclosed as forming the thermal energy management system 320.

Example embodiments of the invention are provided so that this disclosure will be thorough, and will fully convey the scope to those who are skilled in the art. Numerous specific details are set forth such as examples of specific components, devices, and methods, to provide a thorough understanding of aspects of the present disclosure. It will be apparent to those skilled in the art that specific details need not be employed, that example aspects may be embodied in many different forms and that neither should be construed to limit the scope of the disclosure. In some example aspects, well-known processes, well-known device structures, and well-known technologies are not described in detail.

The foregoing description of the embodiments of the invention has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermal energy management system for an internal combustion engine of a motor vehicle comprising:
    a coolant circuit including the internal combustion engine and a first heat exchanger, the coolant circuit configured to convey a coolant therethrough, wherein the coolant circuit further comprises a latent heat storage unit in fluid communication with the first heat exchanger, wherein the coolant circuit further comprises a second heat exchanger in fluid communication with each of the first heat exchanger and the latent heat storage unit, the second heat exchanger exchanging heat energy between the coolant flowing through the coolant circuit and an oil flowing from the internal combustion engine in an oil circuit, and wherein the coolant flows through the coolant circuit in a following order: the first heat exchanger, the second heat exchanger, and the latent heat storage unit; and
    a gas circuit including the internal combustion engine, the first heat exchanger, and an exhaust line, the gas circuit configured to convey an exhaust gas produced by the internal combustion engine, the first heat exchanger exchanging heat energy between the coolant flowing through the coolant circuit and the exhaust gas flowing through the gas circuit.

2. The thermal energy management system of claim 1, wherein the exhaust gas is heated by the internal combustion engine and transfers heat energy to the coolant within the first heat exchanger.

3. The thermal energy management system of claim 2, wherein at least a portion of the exhaust gas heated by the internal combustion engine is recirculated to the internal combustion engine without flowing through the first heat exchanger.

4. The thermal energy management system of claim 1, wherein the gas circuit includes a first proportional valve disposed upstream of the first heat exchanger with respect to a direction of the exhaust gas flowing through the gas circuit, the first proportional valve selectively directing the exhaust gas to flow to at least one of the first heat exchanger, the exhaust line, and the internal combustion engine.

5. The thermal energy management system of claim 4, wherein the gas circuit includes a second proportional valve disposed downstream of the first heat exchanger with respect to the direction of the exhaust gas flowing through the gas circuit, the second proportional valve selectively directing the exhaust gas to flow to at least one of the exhaust line and the internal combustion engine.

6. The thermal energy management system of claim 5, wherein at least a portion of the exhaust gas flows through the first proportional valve, and wherein the gas circuit includes an On/Off valve disposed downstream of the first proportional valve with respect to the direction of the exhaust gas flowing through the gas circuit, the On/Off valve selectively conveying the at least the portion of the exhaust gas flowing through the first proportional valve to at least one of the exhaust line and the internal combustion engine.

7. The thermal energy management system of claim 6, wherein the first proportional valve, the second proportional valve, the heat exchanger, and the On/Off valve are packaged together as a single package unit.

8. The thermal energy management system of claim 1, wherein the gas circuit further includes a compressor, a turbine, a 3-way catalyst, and a debris filter each conveying the exhaust gas therethrough.

9. A thermal energy management system for an internal combustion engine of a motor vehicle comprising:
a coolant circuit including the internal combustion engine and a first heat exchanger, the coolant circuit configured to convey a coolant therethrough, wherein the coolant circuit further includes a latent heat storage unit and a second heat exchanger, wherein the latent heat storage unit is in fluid communication with the first heat exchanger and the second heat exchanger is in fluid communication with each of the first heat exchanger and the latent heat storage unit, and wherein the coolant flows through the coolant circuit in a following order: the first heat exchanger, the second heat exchanger, and the latent heat storage unit;
a gas circuit including the internal combustion engine, the first heat exchanger, and an exhaust line, the gas circuit configured to convey an exhaust gas produced by the internal combustion engine, the first heat exchanger exchanging heat energy between the coolant flowing through the coolant circuit and the exhaust gas flowing through the gas circuit; and
an oil circuit including the second heat exchanger in fluid communication with the first heat exchanger, wherein the second heat exchanger exchanges heat energy between the coolant flowing through the coolant circuit and an oil flowing through the oil circuit.

10. The thermal energy management system of claim 9, wherein the gas circuit includes a first proportional valve disposed upstream of the first heat exchanger with respect to the exhaust gas flowing through the gas circuit, the first proportional valve selectively directing the exhaust gas to flow to at least one of the first heat exchanger and the exhaust line.

11. The thermal energy management system of claim 10, wherein the first proportional valve, the first heat exchanger, and the second heat exchanger are packaged together as a single package unit.

12. The thermal energy management system of claim 10, wherein the first proportional valve, the first heat exchanger, the second heat exchanger, and the latent heat storage unit are packaged together as a single package unit.

13. A method of operating a thermal energy management system for an internal combustion engine, the method comprising the steps of:
providing a coolant circuit including the internal combustion engine and a first heat exchanger, the coolant circuit configured to convey a coolant therethrough, wherein the coolant circuit further includes a latent heat storage unit and a second heat exchanger, wherein the latent heat storage unit is in fluid communication with the first heat exchanger and the second heat exchanger is in fluid communication with each of the first heat exchanger and the latent heat storage unit, the second heat exchanger exchanging heat energy between the coolant flowing through the coolant circuit and an oil flowing from the internal combustion engine in an oil circuit, and wherein the coolant flows through the coolant circuit in a following order: the first heat exchanger, the second heat exchanger, and the latent heat storage unit;
providing a gas circuit including the internal combustion engine, the first heat exchanger, and an exhaust line, the gas circuit configured to convey an exhaust gas produced by the internal combustion engine, the first heat exchanger exchanging heat energy between the coolant flowing through the coolant circuit and the exhaust gas flowing through the gas circuit;
operating the thermal management system in at least one of a first phase and a second phase; and
selectively controlling at least a portion of an entirety of the flow of the exhaust gas to one of bypass the first heat exchanger and mix with the air being introduced into the internal combustion engine, flow to the exhuast line, and flow through the first heat exchanger.

14. The method of claim 13, wherein during the first phase the entirety of the flow of the exhaust gas bypasses the first heat exchanger.

15. The method of claim 13, wherein during the second phase the entirety of the flow of the exhaust gas flows through the first heat exchanger.

* * * * *